Nov. 29, 1932.  H. W. McINTOSH  1,889,516
ELECTRODE FOR USE IN MELTING FURNACES AND METHOD OF FORMING THE SAME
Filed Feb. 5, 1931
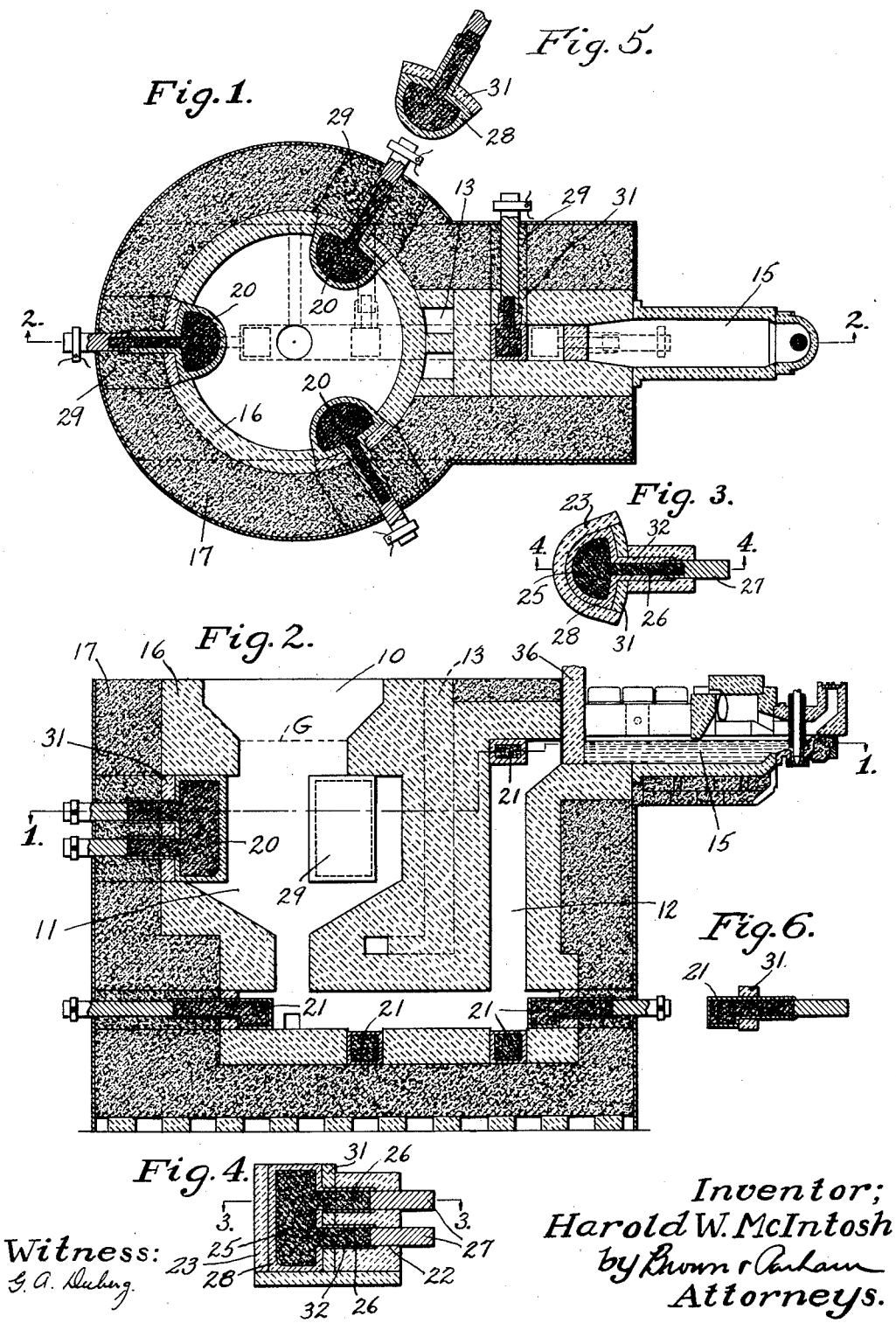
Inventor;
Harold W. McIntosh
by Brown & Carham
Attorneys.

Patented Nov. 29, 1932

1,889,516

UNITED STATES PATENT OFFICE

HAROLD W. McINTOSH, OF WINDSOR, CONNECTICUT, ASSIGNOR TO HARTFORD-EMPIRE COMPANY, OF HARTFORD, CONNECTICUT, A CORPORATION OF DELAWARE

ELECTRODE FOR USE IN MELTING FURNACES AND METHOD OF FORMING THE SAME

Application filed February 5, 1931. Serial No. 513,638.

The present invention relates to the method of forming and mounting, for use in electric furnaces, electrodes composed of conducting material which, when exposed to high temperatures in the presence of air, tend to oxidize. Such materials, when partially immersed in a bath of material to be melted, such as glass and glass making materials, tend to discolor the material to be melted by reason of the oxidation which occurs upon their surfaces.

Foremost of materials of the type above mentioned is graphite which, save for this oxidation and consequent discoloration of the glass, provides a highly satisfactory electrode for glass melting furnaces in which the glass acts as a resistance.

It has been found that graphite electrodes, if submerged below the surface of the glass bath so that all surfaces of the electrode are sealed from the air, may be employed satisfactorily in glass furnaces, but obviously a serious problem arises in obtaining the submergence of the entire electrode. If the electrodes are first set in the walls of the furnace and the glass and glass-making materials then introduced into the furnace, the electrodes are exposed to air and high temperature during the time in which the bath gradually rises to the level of their upper surfaces, and during this period oxidation of the electrode and consequent discoloration of the glass occurs. On the other hand, it is very difficult to instantaneously submerge an electrode in a bath contained in a furnace and to thereafter secure it properly in place.

It is the object of this invention to solve this problem in a simple and effective manner, specifically by pre-coating the electrode with a non-oxidizing material applied in a manner to prevent any substantial oxidation of the electrode and to thereafter insert the coated electrode in its proper position in the tank, the coating being such that it will shield the electrode material from air at least until the electrode can be completely submerged by the glass bath.

More specifically, it is the purpose of this invention to pre-coat electrodes for use in a glass melting furnace with glass or other material having constituents similar to those of glass, and to thereafter insert the coated electrodes in the furnace.

In such an arrangement as is now proposed, the coating of the electrode serves as a temporary shield or plating which excludes the air from the electrode until it is completely submerged by the material to be melted, and thereafter the coating may melt and be incorporated in the glass bath. It being of the same or substantially the same constituent parts as the glass of the bath, the coating may become incorporated therein without injury to the bath. These and other objects of my invention will appear from the following specification when considered in connection with the accompanying drawing, in which, Figure 1 is a horizontal section through an electric glass melting furnace embodying my invention, taken on the line 1—1 of Fig. 2;

Fig. 2 is a vertical section of the furnace of Fig. 1, taken on the line 2—2 of Fig. 1;

Fig. 3 illustrates one form of the method and apparatus employed in pre-coating electrodes, and is a view in horizontal section taken on the line 3—3 of Fig. 4 of a mold containing an electrode which has been coated with the coating above referred to;

Fig. 4 is a vertical section of the apparatus of Fig. 3, taken on the line 4—4 of Fig. 3;

Fig. 5 is a horizontal sectional view of an electrode ready for insertion into the furnace of Fig. 1 in the position adjacent thereto; and Fig. 6 is a vertical sectional view of an electrode ready for insertion into the furnace of Fig. 2 in the position adjacent thereto.

Referring particularly to Figs. 1 and 2, the furnace therein shown comprises a feeding chamber 10 into which glass-making batch is fed, a melting chamber 11 therebelow, a forehearth 15 and a throat 12 between the melting chamber and the forehearth. The furnace is preferably lined with highly refractory bricks 16, such as those disclosed in U. S. Patent No. 1,605,885 to Paul G. Willetts, granted November 2, 1926, backed by insulating material 17. An air passageway 13 is provided for cooling the refractories of that portion of the furnace lying between the melting chamber 11 and the throat 12.

Equidistantly spaced about the melting chamber 11 in a position to be submerged by the glass when the furnace is at normal operating level, indicated at G, are electrodes 20 adapted for connection to the phases of a three-phase alternating current. Spaced in the throat 12 are other electrodes 21 adapted for connection to single phase circuits as may be found desirable to control the heat of glass in the throat.

The electrodes may be of different shapes, but usually have a head portion 25 with one or more necks 26 to which are attached terminals 27.

As indicated in the drawing, the head 25 of each of the electrodes is covered with a layer of glass 28 which extends back along the stem 26. The layer of glass is preferably colorless and completely covers the electrode. The distance which the glass extends along the stem of the electrode bears a direct relationship to the heat of the furnace as the covering should extend to such an extent along the stem that all portions of the stem which might be heated, when the furnace is in operation, to an oxidizing temperature will be covered.

As is well known, the temperature of the refractory materials in the furnace must be gradually raised to the temperature which it will have to withstand in melting glass. This is preferably accomplished by the use of portable gas or oil burners. If the glass covered electrodes were in place during the warming of the furnace, the glass covering might melt and flow off the electrodes before they were covered by glass being manufactured. I, therefore, do not insert the electrodes until after the furnace has been highly heated. For the purpose of inserting the electrodes after the furnace has been warmed up, in constructing the furnace, I leave openings 29 in the walls thereof at the points where I desire to position electrodes. During the warming up of the furnace, portable burners may, if desired, be inserted through these openings.

Optionally, in many instances glass having a relatively higher melting temperature than that to be first melted in the furnace may be used as the electrode covering, and electrodes thus covered may be built into the furnace or inserted while it is being heated.

There is provided a suitable refractory support for the electrodes comprising refractory blocks 31 shaped to fit into the openings 29. The stems 26 of the electrodes are spaced from the sides of openings in the blocks 31 through which they extend by the layer of glass 32 extending along the stem, thus making the connection between the stem and the refractory practically air tight.

By forming a mold 23 of refractory material, including blocks 31, as shown in Figs. 3 and 4, and by first passing the electrode stems 26 through the refractory blocks 31 and then supporting the electrode entirely out of contact with the mold except at the extreme ends of the stem by which they are supported, as at 22 (Fig. 4), and which it is not desirable to cover with glass, I can provide a readily usable means of applying the glass covering to the electrodes. It is desirable in positioning the electrode in the mold that it be spaced from the refractory blocks 31 which form part of the furnace wall so that it will be completely surrounded by the glass 28 as shown in Fig. 4.

The glass which is to form the covering is preferably the same as that of the bath and sufficiently heated to be of low viscosity. By quickly covering the electrode with the glass, oxidation of the electrode will be prevented and the covering will not be discolored, as the electrode is completely covered before its temperature reaches that at which oxidation occurs. The mold may be filled in a vacuum, or a heavy non-oxidizing gas may be used to displace all air in the mold before the molten glass is poured in.

While, as previously pointed out, it is desirable to insert the electrodes in the furnace after the furnace has been warmed up in order to keep the glass from flowing off the electrodes, it is possible to place the covered electrodes in position as the furnace is built and water-cool them to keep them at a sufficiently low temperature to maintain the covering at a high viscosity, and thus prevent the exposure of the electrode proper.

In commencing the operation of the furnace, batch may be melted into glass in the forehearth 15 with the gate 36 between it and the throat 12 lowered, or molten glass poured into the forehearth after the temperature has been raised sufficiently by the use of portable gas or oil burners. The burners are then withdrawn from the lowermost openings in the furnace, electrodes inserted therein, the gate 36 raised, and the glass allowed to flow down the throat and thus submerge the lower electrodes 21. Current may then be turned on between preferred pairs of these electrodes. Further glass can then be melted in the forehearth. By repeating the operation, the level of glass in the melting end of the furnace may be raised until it approaches a level slightly below the electrodes 20. The burners may then be withdrawn from the openings through which these electrodes are to be inserted, and the electrodes placed in position, and further glass poured in or cullet filled in and melted until the glass is sufficiently deep to completely cover these electrodes. Batch then may be introduced through the batch opening 10 and the making of glass from batch electrically commences.

The viscosity of the glass covering on the electrodes will lower after the electrodes are submerged in the glass in the furnace, and the major portion of the covering will form a part of the glass bath in the tank. However, by the time such action occurs the electrodes will be submerged and be maintained free from contact with the atmosphere.

While in the specification and claims I refer to glass, this invention is not necessarily limited to making glass, but may equally well be used in the making of glass-like substances such as soluble silicates of soda (water glass), or vitreous enamels, etc., and hence when the term glass is used in the claims it is to be construed sufficiently broadly to cover such substances. Similarly, in place of the forehearth disclosed there may be used a drawing kiln for making sheet glass, or any other type of desired outlet.

Various modifications and changes may be made from the above described embodiment of my invention without departing from the scope thereof as set forth in the following claims:

I claim:

1. In an electric furnace for melting glass, an electrode adapted to be immersed in the melting glass comprising a carbon head, a stem attached to said head, a refractory block encircling said stem and a layer of glass surrounding said electrode and the portion of said stem extending through the refractory block, said layer of glass having a higher softening and melting temperature than the glass to be melted in said furnace.

2. A furnace for making glass and similar substances in which the substance to be made acts as the resistance to a current of electricity, comprising refractory walls, openings in said walls, refractory blocks shaped to fit said openings, and electrodes having stems embedded in said blocks and having heads covered with a layer of glass of lesser size than said openings, whereby said covered electrodes may be inserted in the furnace after said furnace is built.

3. In a furnace for making glass and similar substances in which the substance to be made acts as the resistance to a current of electricity, an electrode adapted to be immersed in said substance, the portions thereof which are adapted to contact with the substance to be made being covered with a layer of said substance prior to its insertion in the furnace.

4. The method of starting a furnace in which the substance to be made acts as the resistance to a current of electricity passing between electrodes in contact with said substance, which comprises covering the portions of the electrodes which are adapted to contact with the substance to be made with a highly viscous layer of said substance, submerging the covered electrodes in a less viscous bath of said substance, and passing a current of electricity between the electrodes.

5. The method of starting a furnace in which the substance to be made acts as the resistance to a current of electricity passing between electrodes which comprises, applying a protective coating to the portions of the electrodes which are adapted to contact with the substance to be made, submerging the electrodes in a bath of the substance to be made, and incorporating the material of the protective coating in said bath.

6. The method of preparing an electrode for use in a glass melting furnace wherein the glass acts as a resistor, which comprises precoating the surface of the electrode with glass applied before the temperature of the electrode rises to that at which the electrode will oxidize.

7. The method of preparing an electrode for use in contact with molten glass which comprises covering the surface of the electrode which is adapted to contact with the glass with a temporary coating adapted to exclude air from the electrode, said coating being applied under conditions of temperature and atmosphere such that no oxidation occurs on the surface of the electrode during the coating and said coating material being such that it may become dislodged from the surface of the electrode when the same is placed in contact with molten glass without causing an appreciable change in the color and other characteristics of the glass.

Signed at Hartford, Connecticut this 21st day of January, 1931.

HAROLD W. McINTOSH.